(No Model.)
A. WILBUR.
PIPE COUPLING.
No. 344,760. Patented June 29, 1886.
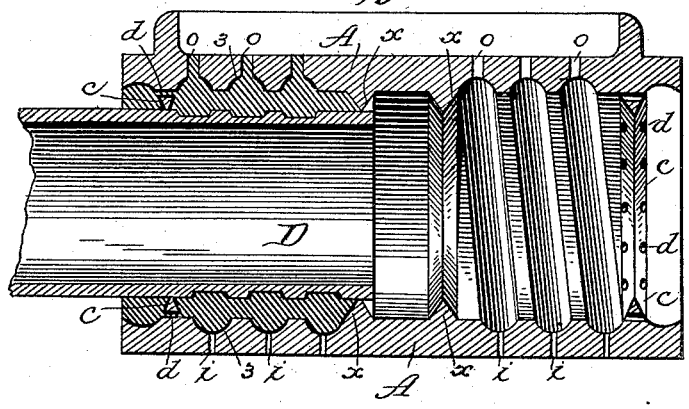
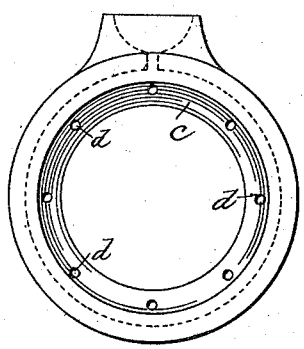
Attest:
Walter Donaldson
Frank L. Middleton
Inventor:
Alfred Wilbur
by Dyer & Speer
Attys.

UNITED STATES PATENT OFFICE.

ALFRED WILBUR, OF ALLEGHENY CITY, PENNSYLVANIA.

PIPE-COUPLING.

SPECIFICATION forming part of Letters Patent No. 344,760, dated June 29, 1886.

Application filed April 28, 1886. Serial No. 200,403. (No model.)

*To all whom it may concern:*

Be it known that I, ALFRED WILBUR, of Allegheny City, in the county of Allegheny and State of Pennsylvania, have invented a new and useful Improvement in Pipe-Couplings; and I do hereby declare that the following is a full, clear, and exact description of the same.

My invention relates to pipe-couplings, and is an improvement upon the coupling shown in Letters Patent No. 339,036, granted to me on the 30th of March, 1886. In the said patent the coupling was shown as consisting of a sleeve adapted to fit over threaded pipe ends, with recesses in said sleeve forming a chamber for the lead filling, the said sleeve having ribs near its center to form one wall of the chamber, and unthreaded ends fitting closely around the pipe ends to form the other wall of the chamber containing the filling.

The object of the present invention is to provide means for making the outer ends of the sleeve less liable to leak, or to permit exit of the gas or liquid which may be in the pipes under pressure.

The invention consists in providing a rib upon the inside a short distance from each end of the sleeve, this rib being adapted to fit closely around the pipe, a chamber being formed between this rib and the end of the sleeve of a little larger diameter than the pipe to which it is applied, so as to permit of calking, perforations being made in the said rib for the passage of the lead from the interior chamber to the chamber immediately around the ends of the sleeve.

In the accompanying drawings, Figure 1 represents a central vertical section; and Fig. 2 is a section on line *x* of Fig. 1, showing the perforations through the rib.

The coupling shown is in all respects similar to that particularly described and illustrated in the Letters Patent heretofore referred to, with the exception of the outer ends of the sleeve, which change constitutes the essence of the present invention.

The sleeve proper is shown at A, the threaded end of the pipe at D, the internal threads of the sleeve at 3, the ribs forming the rear walls of the chamber at *x x*, the opening for the lead filling into the chamber at *o o*, and the openings at the bottom of the sleeve for the exit of the heated air at *i i*.

Instead of forming the ends of the sleeve unthreaded and having them fit the pipe closely, a chamber is formed at each end for a short distance—say from one-half to three-fourths of an inch from each end—or any suitable space. Separating this recess or outer chamber from the inner chamber is a rib, *c*, which is adapted to fit closely around the pipe and close the opening to the interior chamber. This rib forms the opposite wall of the said interior chamber, and it will be understood that one is provided at each end of the sleeve. Perforations *d* are made at suitable distances apart through this rib, as shown in Fig. 2, and the object of these perforations is to permit the lead to flow through the same into the recess or outer chamber at the ends of the coupling. After the pipe is in place the lead which has flowed through into the outer recess at the ends of the coupling is thoroughly calked, and the compression thus given to it will effectually close up every opening which may possibly exist, and all danger of leakage is thus avoided.

I claim—

In combination with threaded pipe end, a sleeve covering the same, a chamber within the same, and outer recess or chamber at the end of the sleeve, and a rib separating the inner and outer chambers, said rib having perforations therein, substantially as described.

In testimony whereof I have signed my name to this specification in the presence of two subscribing witnesses.

ALFRED WILBUR.

Witnesses:
CLARENCE BURLEIGH,
CHAS. A. FAGAN.